(12) United States Patent
VanWiggeren et al.

(10) Patent No.: US 7,009,691 B2
(45) Date of Patent: Mar. 7, 2006

(54) SYSTEM AND METHOD FOR REMOVING THE RELATIVE PHASE UNCERTAINTY IN DEVICE CHARACTERIZATIONS PERFORMED WITH A POLARIMETER

(75) Inventors: Gregory D. VanWiggeren, Los Gatos, CA (US); Douglas M. Baney, Los Altos, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 472 days.

(21) Appl. No.: 10/157,682

(22) Filed: May 29, 2002

(65) Prior Publication Data

US 2003/0223073 A1     Dec. 4, 2003

(51) Int. Cl.
*G01B 9/02* (2006.01)
(52) U.S. Cl. .................................... 356/73.1; 356/491
(58) Field of Classification Search ............... 356/477, 356/451, 453, 460, 491, 73.1, 517, 450
See application file for complete search history.

(56) References Cited

U.S. PATENT DOCUMENTS

| | | | | |
|---|---|---|---|---|
| 3,700,334 A | * | 10/1972 | Low et al. .................. | 356/453 |
| 4,479,100 A | | 10/1984 | Moghe et al. | |
| 4,560,279 A | * | 12/1985 | Kouns ........................ | 356/369 |
| 5,227,623 A | * | 7/1993 | Heffner ...................... | 250/225 |
| 5,777,740 A | * | 7/1998 | Lacey et al. ................ | 356/495 |
| 6,204,924 B1 | * | 3/2001 | Cyr ............................ | 356/453 |
| 6,211,957 B1 | * | 4/2001 | Erdogan et al. ............. | 356/364 |
| 6,239,877 B1 | * | 5/2001 | Beauducel ................... | 356/484 |
| 6,490,043 B1 | * | 12/2002 | Kebabian .................... | 356/453 |
| 6,606,158 B1 | * | 8/2003 | Rosenfeldt et al. ......... | 356/477 |
| 6,674,532 B1 | * | 1/2004 | VanDelden .................. | 356/491 |
| 2003/0007228 A1 | | 1/2003 | Shirai | |
| 2003/0147574 A1 | | 8/2003 | Lam et al. | |

OTHER PUBLICATIONS

Baney, Douglas M. et al., "Coherent Optical Spectrum Analyzer", IEEE Photonics Technology Letters, vol. 14, No. 3, Mar. 2002, pp. 355-357.
Simova, E. et al., "Characterization of Chromatic Dispersion and Polarization Sensitivity in Fiber Gratings", IEEE Transactions on Instrumentation and Measurement, vol. 48, No. 5, Oct. 1999, pp. 939-943.
Heffner, B. L., "Automated Measurement of Polarization Mode Dispersion Using Jones Matrix Eigenanalysis", IEEE Photonics Technology Letters, vol. 4, No. 9, Sep. 1992, pp. 1066-1069.
Lewen R. et al., "Ultra High-Speed Segmented Traveling-Wave Electroabsorption Modulators" Optical Fiber Communications Conference, vol. 3, pp. 1-3.
Shirai M. et al., "40 Gbit/s ELectroabsorption Modulators with Impedance-Controlled Electrodes", Electronics Letters, vol. 39, No. 9, May 1, 2003, pp. 733-735.
Li, G. L. et al., "Ultrahigh-Speed Traveling-Wave Electroabsorption Modulator-Design and Analaysis" IEEE Transactions on Microwave Theory and Techniques, vol. 47, No. 7, Jul. 1999, pp. 1177-1183.

(Continued)

*Primary Examiner*—Andrew H. Lee
(74) *Attorney, Agent, or Firm*—Juergen Krause-Polstorff

(57) ABSTRACT

By making combined interferometric and polarimetric measurements on a device under test, the relative phase uncertainty in device characterizations performed with a polarimeter or polarization analyzer alone is removed. This allows determination of the group delay to within a constant offset and the chromatic dispersion of the device under test.

44 Claims, 6 Drawing Sheets

OTHER PUBLICATIONS

Lewen, R. et al., "Segmented Transmission-Line Electroabsorption Modulators", Journal of Lightwave Technology, vol. 22, No. 1, pp. 172-179.

Lewen R. et al., "Microwave CAD Circuit Modeling of a Traveling-Wave Electroabsorption Modulator", IEEE Transactions on Microwave Theory and Techniques, vol. 51, No. 4, pp. 1117-1128.

Pozar, D. M., "Microwave Engineering" 1998, John Wiley & Sons, p. 56.

* cited by examiner

SYSTEM AND METHOD FOR REMOVING THE RELATIVE PHASE UNCERTAINTY IN DEVICE CHARACTERIZATIONS PERFORMED WITH A POLARIMETER

BACKGROUND OF INVENTION

Today's high speed communication systems require accurate knowledge of the group delay of a device as a function of wavelength. Many optical devices have group delays that depend on the input polarization state. Effectively, these optical devices have a polarization dependent group delay. Measurements performed with a polarimeter only enable the determination of the difference between the group delay of the fast polarization input state and the slow polarization input state. This limitation reflects the polarimeter's inability to measure the individual group delay of the fast polarization input state and of the slow polarization input state.

Typical polarimeters are capable of determining the Jones matrix of an optical device. The information contained in the Jones matrix is sufficient to determine many transmission properties of a two-port optical device, such as the differential group delay (DGD), polarization mode dispersion (PMD) and the polarization dependent loss (PDL). Unfortunately, the information provided by the Jones matrix is not sufficient to determine chromatic dispersion (CD) and group delay (GD) of the principal states of polarization. Chromatic dispersion is a variation in the speed of propagation of the lightwave signal with wavelength and group delay is the difference in transit times at different wavelengths. However, a polarization analyzer can only measure the relative group delay, i.e. DGD, between the two principle states of polarization.

Simova et al. in "Characterization of Chromatic Dispersion and Polarization Sensitivity in Fiber Gratings", in IEEE Transactions on Instrumentation and Measurement, Vol. 48, No. 5, 939–943, 1999 disclose a measurement procedure in which a polarization analyzer is used in conjunction with a chromatic dispersion analyzer based on rf-modulation phase shift technique. In this measurement procedure, the two instruments are used together to determine DGD, PMD, PDL, GD and CD. This measurement procedure requires two relatively expensive and complicated instruments to be used independently of each other for measurements on the device under test (DUT). The DUT must be measured at separate times by two completely distinct measurement systems which may also introduce errors into the measurement process.

A precision of 10 femtoseconds has been demonstrated for polarimetric measurements for determining the differential group delay (DGD) (see Heffner, IEEE Photonics Technology Letters, vol. 4, no. 9, 1992) while interferometric measurements for determining the differential group delay (DGD) are typically an order of magnitude less precise.

Hence, a desirable measurement system for optical communication components needs to be able to quickly, easily and accurately measure desired optical parameters such as: DGD, PMD, PDL, GD and CD.

SUMMARY OF INVENTION

In accordance with the invention, combining a typical polarimeter or polarization analyzer, such as the Agilent 8509B with an interferometer into a combined interferometric and polarimetric system allows the quick and accurate determination of the desired optical parameters such as: DGD, PMD, PDL, GD and CDassociated with a device under test (DUT) in a comparatively short period of time without repeated disconnecting and reconnecting of the DUT thereby satisfying the need for a rapid and accurate measurement of desired optical parameters. The DUT may be an inactive device such as an optical fiber or an active device such as an optical amplifier. In addition, the combined interferometric and polarimetric system in accordance with the invention allows an inexpensive way to extend the measurements that can be made using a polarization analyzer or polarimeter alone. Such a combined system is advantageous compared to present totally interferometric systems for determining the fast and slow group delays and the chromatic dispersion.

DETAILED DESCRIPTION OF THE INVENTION

Figure 1A:
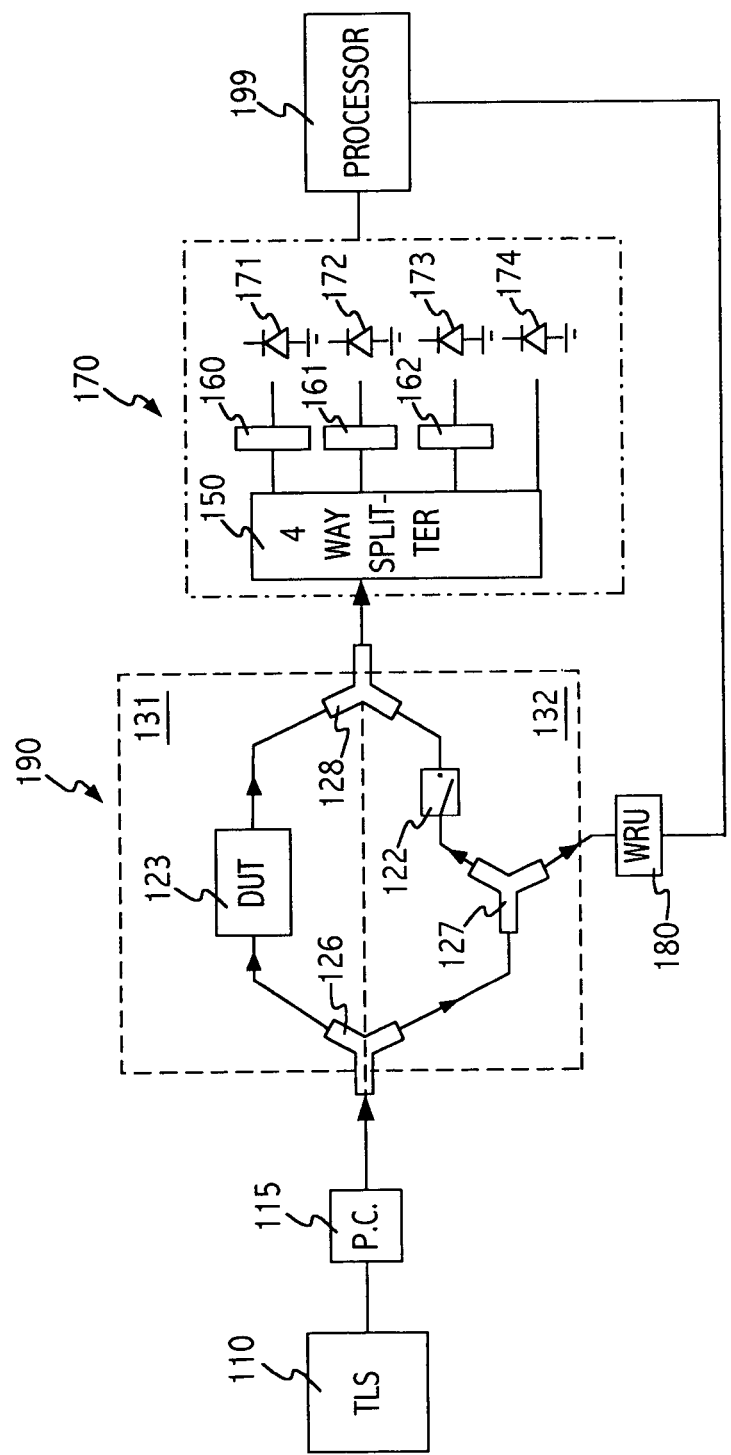
FIG. 1a shows a simplified block diagram of an embodiment in accordance with the invention.

The Jones matrix, $\underline{U}$ of an optical device under test can be readily determined using a typical polarization analyzer. The Jones matrix, $\underline{U}$ is only determined to within a complex constant C, where C is a complex constant whose phase is the phase difference between the input and output light of the device under test and whose magnitude is related to the transmittance of the optical device under test. This complex constant cannot be determined using a typical polarimeter alone. The transfer matrix $\underline{T}$ is written as:

$$\underline{T} = C\underline{U} = C\begin{pmatrix} u_{11} & u_{12} \\ u_{21} & u_{22} \end{pmatrix} \quad (1)$$

The elements of the Jones matrix, $u_{ij}$, can be determined from polarimeter measurements but C cannot. The transfer matrix of a device under test (DUT) describes the relationship between the light input to the DUT and the light output from the DUT. Mathematically, this relationship may be expressed as $$\underline{T}\vec{E}_{in} = \sigma e^{i\phi}\vec{E}_{out} \quad (2)$$

where $\vec{E}_{in}$ and $\vec{E}_{out}$ are unit vectors.

If $\vec{E}_{out}$ corresponds to a principle state of polarization (PSP), it corresponds to either a fast or slow polarization axis which means that the polarization of $\vec{E}_{out}$ does not change as the frequency of the input is changed. By definition then, $d\vec{E}_{out}^{\pm}/d\omega=0$, where $\vec{E}_{out}^{\pm}$ represents the fast and slow PSP, respectively. Taking the derivative of both sides in equation (2) with respect to $\omega$ and taking into account the frequency independence of the PSP yields:

$$\left(\frac{\sigma'}{\sigma} + i\tau_g^\pm\right)\vec{E_{in}^\pm} = [\underline{T}^{-1}\underline{T}']\vec{E_{in}^\pm} \quad (3)$$

where $\sigma'=d\sigma/d\omega$, $\underline{T}'=d\underline{T}/d\omega$ and $\tau_g^\pm=d\phi^\pm/d\omega$. Equation (3) is an eigenvalue equation and shows that the imaginary parts of $[\underline{T}^{-1}\underline{T}']$ correspond to the fast and slow group delays that are associated with the principle states of polarization. Substituting equation (1) into equation (3) and noting that the prime (') denotes differentiation with respect to $\omega$, gives:

$$\left(\frac{\sigma'}{\sigma} + i\tau_g^\pm\right)\vec{E_{in}^\pm} = \left[[C^{-1}C'] + \begin{pmatrix} u_{11} & u_{12} \\ u_{21} & u_{22} \end{pmatrix}^{-1} \begin{pmatrix} u_{11} & u_{12} \\ u_{21} & u_{22} \end{pmatrix}'\right]\vec{E_{in}^\pm} \quad (4)$$

Rewriting C as $C_0 e^{i\phi_C}$ gives for the fast and slow group delay values:

$$\tau_g^\pm = \frac{d\phi_C}{d\omega} + \text{eigenvalue}\left\{\begin{pmatrix} u_{11} & u_{12} \\ u_{21} & u_{22} \end{pmatrix}^{-1} \begin{pmatrix} u_{11} & u_{12} \\ u_{21} & u_{22} \end{pmatrix}'\right\} \quad (5)$$

where eigenvalue { } indicates the two eigenvalues of the bracketed argument. A polarimeter cannot determine the quantity $d\phi_C/d\omega$ but the differential group delay (DGD) may be obtained using only a typical polarimeter measurement as is apparent from equations (5) and (6):

$$DGD = \tau_g^+ - \tau_g^- \quad (6)$$

Determination of the group delay term requires determination of $d\phi_C/d\omega$.

FIG. 1a shows an embodiment of a system for transmissivity measurements of DUT 123 in accordance with the invention that allows non-interferometric determination of the Jones matrix using polarimeter 170, but also includes an interferometric measurement capability to allow determination of the group delay term, $\tau_g^\pm$, to within a constant offset. Determining group delay to within a constant offset is sufficient for practical network applications. Device Under Test (DUT) 123 is the removable optical component whose desired optical parameters such as: DGD, PMD, PDL, GD and CD are measured using the system shown in FIG. 1a. In accordance with the invention, optical connections may typically be optical fiber or other means used for the guiding of light such as bulk optics.

The simplified block diagram of an embodiment in accordance with the invention is shown in FIG. 1a. Tunable laser source (TLS) 110, such as the Agilent 81640B, serves as the local oscillator to produce a swept frequency light beam and is optically connected to polarization controller (P.C.) 115 which allows adjustment of the light polarization. Polarization controller 115 optically connects to optical splitting device 126, typically a fused fiber coupler, which splits the light beam from TLS 110 into interferometer arms 131 and 132. Optical splitting device 126 typically optically connects to Device Under Test (DUT) 123 using pigtails with connectors for easy insertion and removal during component testing and optically connects to optical splitting device 127 which is typically a fused fiber coupler. DUT 123 may also be optically connected to optical splitting device 126 using a combination of optical fiber and bulk optics or bulk optics alone as will be apparent to one skilled in the art. DUT 123 and optical splitting device 127 lie on two separate interferometer arms, 131 and 132, respectively, which are part of DUT interferometer 190. Optical splitting device 127 optically connects to wavelength reference unit (WRU) 180 and to optical switch 122. Optical switch 122 optically connects to optical combining device 128, which is typically a fused fiber coupler. WRU 180 is itself an interferometer which functions to accurately monitor the swept frequency light from TLS 110 and outputs an electrical signal indicative of the monitored swept frequency light to processor 199.

DUT 123 also optically connects to combining device 128, typically a fused fiber coupler, using pigtails with connectors for easy insertion and removal during component testing. DUT 123 may also be optically connected to optical combining device 128 using a combination of optical fiber and bulk optics or bulk optics alone as will be apparent to one skilled in the art. Combining device 128 optically connects to four-way splitter 150 of typical polarimeter 170. Four-way splitter 150 splits the light onto photodetectors 171, 172, 173 and 174. With optical switch 122 in the closed position, photodetectors 171, 172, 173 and 174 detect an interference signal due to the difference in the optical path between interferometer arm 131 and 132. Four-way splitter 150 optically connects to linear 0° polarizer 160, linear 45° polarizer 161, right circular polarizer 162 and directly to photodetector 174. Linear 0° polarizer 160, linear 45° polarizer 161 and right circular polarizer 162 optically connect to photodetectors 171, 172 and 173, respectively. Photodetectors 171, 172, 173 and 174 detect and convert an optical signal to an electrical signal for transmission to processor 199. In accordance with the invention, photodetectors 171, 172, 173 and 174 typically have a bandwidth of a few hundred kilohertz (kHz) or more. Processor 199 is electrically connected to polarimeter 170 and is configured to use the output from photodetectors 171, 172, 173 and 174 to determine the optical parameters of DUT 123.

Figure 1B:
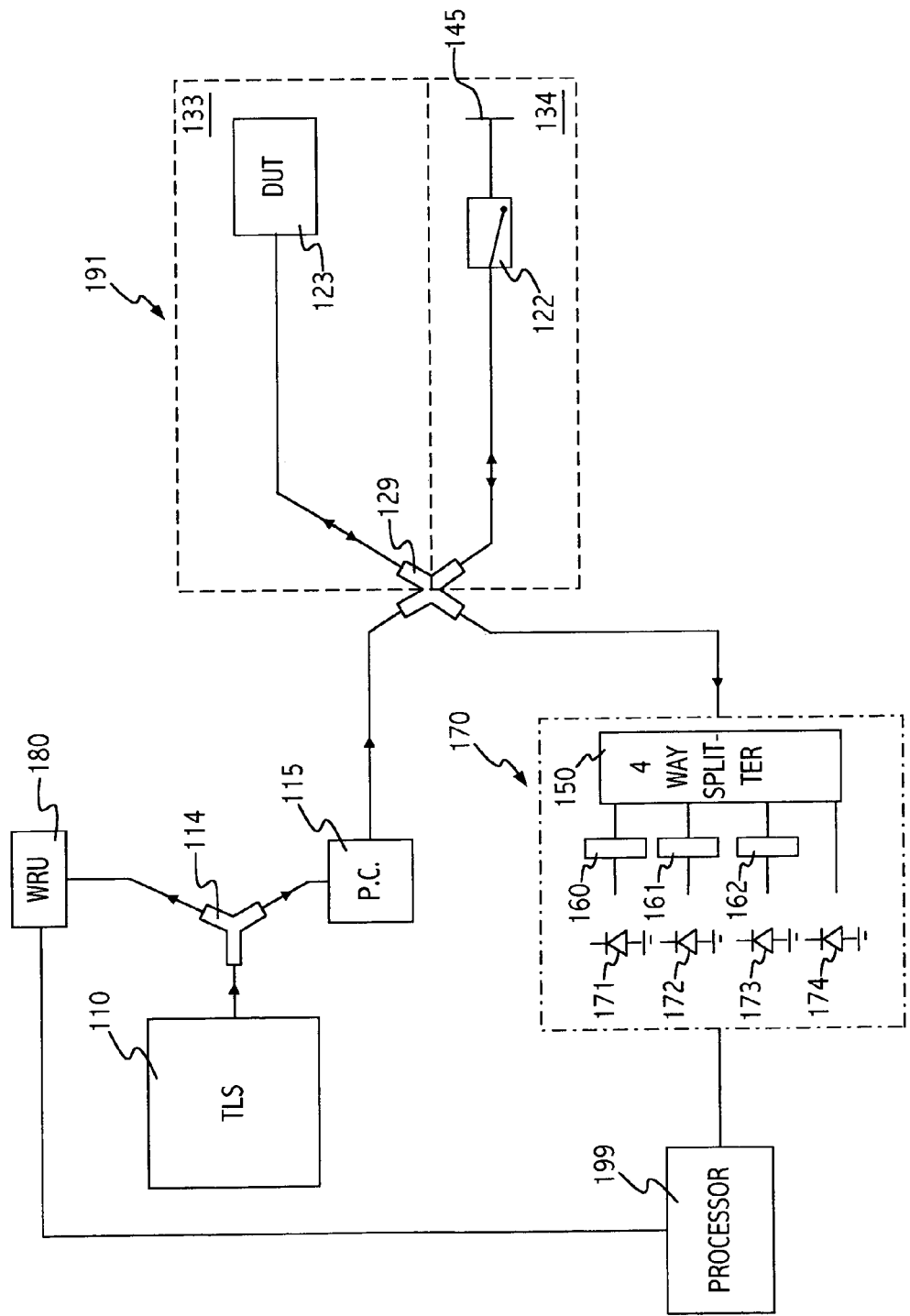
FIG. 1b shows a simplified block diagram of an embodiment in accordance with the invention.

FIG. 1b shows an embodiment of a system for reflectivity measurements of DUT 123 in accordance with the invention that allows non-interferometric determination of the Jones matrix using polarimeter 170, but also includes an interferometric measurement capability to allow determination of the group delay term, $\tau_g^\pm$, to within a constant offset. Determining group delay to within a constant offset is sufficient for practical network applications and group delay to within a constant offset is an optical parameter of interest. Device Under Test (DUT) 123 is the removable optical component whose desired optical parameters such as: DGD, PMD, PDL, GD and CD are determined using the system shown in FIG. 1b. In accordance with the invention, optical connections may typically be optical fiber or other means used for the guiding of light such as bulk optics.

The simplified block diagram of an embodiment in acconlance with the invention is shown In FIG. 1b. Tunable laser source (TLS) 110, such as the Agilent 81640B, serves as the local oscillator to produce a swept frequency light beam and optically connects to optical splitting device 114, typically a fused fiber coupler. Optical splitting device 114 optically connects to polarization controller (P.C.) 115 which allows adjustment of the light polarization and to wavelength reference unit (WRU) 180. WRU 180 is itself an interferometer which functions to accurately monitor the swept frequency light from TLS 110 and outputs an electrical signal indicative of the monitored swept frequency light to processor 199. Polarization controller 115 optically connects to optical combining device 129, typically a fused fiber couplet. Optical combining device 129 splits the light beam from TLS 110 into interferometer arms 133 and 134. Optical combining device 129 optically connects to DUT 123 and optical switch 122 which lie on two separate interferometer arms, 133 and 134, respectively. Optical switch 122 optically connects to mirror 145 that way be movable to adjust optical path length. Optical combining device 129 also optically connects to four-way splitter 150 of polarimeter 170. Four-way splitter 150 splits the light onto photodetectors 171, 172, 173 and 174. With optical switch 122 in the closed position, photodetectors 171, 172, 173 and 174 detect an interference signal due to the difference in the optical path between interferometer arm 133 and 134. Four-way splitter 150 optically connects to linear 0° polarizer 160, linear 45° polarizer 161, right circular polarizer 162 and directly to photodetector 174. Linear 0° polarizer 160, linear 45° polarizer 161 and right circular polarizer 162 optically connect to photodetectors 171, 172 and 173, respectively. Photodetectors 171, 172, 173 and 174 detect and convert an optical signal to an electrical signal for transmission to processor 199. In accordance with the invention, photodetectors 171, 172, 173 and 174 typically have a bandwidth of a few hundred kilohertz (kHz) or more. Processor 199 is electrically connected to polarimeter 170 and is configured to use the output from photodetectors 171, 172, 173 and 174 to determine the optical parameters of DUT 123.

Typical polarimeter 170 can be used to determine reflectivity, transmissivity, PMD, PDL and DGD as is well known to those skilled in the art, see for example, "Fiber Optics, Test and Measurement", D. Dexickson, Prentice-Hall 1998, which is incorporated by reference. Switch 122 is left in the open position when performing polarimetric measurements such as measuring the polarization of the light after it has passed through DUT 123. However, to determine group delay to within a constant offset requires an interference measurement where switch 122 is closed to complete a second optical connection to combining device 128 (see FIG. 1a) or to mirror 145 (see FIG. 1b). The frequency swept light beam generated by TLS 110 is split into two light beams by optical splitting device 126 which enter interferometer arm 131 and interferometer arm 132, respectively, of DUT interferometer 190 in FIG. 1a or is split into two light beams by optical combining device 129 which enter interferometer arm 133 and interferometer arm 134, respectively, of DUT interferometer 191 in FIG. 1b. On interferometer arm 131, the light beam passes through DUT 123 to optical combining device 128 and on interferometer arm 132 the light beam passes through optical switch 122 to optical combining device 128 which outputs both light beams to polarimeter 170 (see FIG. 1a). On interferometer arm 133, part of the light beam is reflected from DUT 123 to optical combining device 129 and on interferometer arm 134 the light beam passes through optical switch 122 to mirror 145 which reflects the light beam back to optical combining device 129 which outputs both beams to polarimeter 170 (see FIG. 1b). Polarimeter 170 then separates the light into components according to polarization, typically into three polarized components having 0°, 45° and right circular polarization, respectively, and an unpolarized component. Regardless of the polarization of tunable laser source 110, there is typically sufficient interference signal on at least one of photodetectors 171, 172, and 173 to measure the phase, $\phi_d$, between the two light beams as a function of wavelength. To maximize measurement accuracy, the largest interference signal is typically analyzed by processor 199 for the phase difference between the two light beams. As will be apparent to one skilled in the art, the embodiments in accordance with the invention shown in FIGS. 1a and 1b can readily be combined into one embodiment in accordance with the invention by adding, for example, one additional optical switch in DUT interferometer arm 131 in FIG. 1a.

In an embodiment in accordance with the invention, an example is described where $\hat{x}$-polarized light is used. This is typically realizable by appropriately adjusting polarization controller 115 to control the polarization of the swept frequency light beam from TLS 110. For simplicity, it is also assumed that the highest intensity interference signal is measured on photodetector 171 of polarimeter 170. However, photodetectors 172 or 173 and any known input polarization may be used in accordance with the invention, as will be readily apparent to those skilled in the art. If measurements of the highest intensity interference signal are made on photodetector 172 or 173 instead of photodetector 171, the details of the analysis present here are modified to account for the difference in the polarization of the light incident on photodetectors 172 or 173. In general, the results will involve a combination of the elements $u_{11}, u_{12}, u_{21}, u_{22}$ of the Jones matrix. The elements of the Jones matrix for DUT 123 may be determined from the three output Jones vectors or output polarizations in response to three known input polarizations, as described in, for example, "Fiber Optics, Test and Measurement", D. Derickson, Prentice-Hall 1998, which is incorporated by reference.

Typically, the three known input polarizations are: linear 0°, linear 90° and linear 45°. The three input polarizations of the light beam are typically selected using polarization controller 115 to control the polarization of the light beam from TLS 110. Note that the light beam from TLS 110 for this measurement may be swept frequency or, more typically, stepped frequency. The respective output polarizations of the light beam corresponding to inputs of linear 0°, linear 90° and linear 45° are then determined using polarimeter 170. Note that optical switch 122 is in the open position for this measurement to prevent light from traveling through interferometer arm 132. For example, if the output Jones vector corresponding to: linear 0° input is taken to be $(X_1, Y_1)$, linear 90° input is taken to be $(X_2, Y_2)$ and linear 45° input is taken to be $(X_3, Y_3)$ then the following ratios may be defined which determine the elements of the Jones matrix: $k_1 = X_1/Y_1$; $k_2 = X_2/Y_2$; $k_3 = X_3/Y_3$; and $k_4 = (k_3 - k_2)/(k_1 - k_3)$. Note that $k_1$, $k_2$, and $k_3$ may be expressed in terms of the corresponding Stokes parameters $s_0, s_1, s_2, s_3$ for the respective measured output polarizations. Hence, for $j = 1, 2, 3$:

$$k_j = \left\{ \frac{s_2 + i s_3}{s_0 - s_1} \right\}_j \tag{7}$$

where j indicates the jth group of Stokes parameters corresponding to $k_j$.

The elements of the Jones matrix are:

$$u_{11} = k_1 k_4 \tag{8a}$$

$$u_{12} = k_2 \tag{8b}$$

$$u_{21} = k_4 \tag{8c}$$

$$u_{22} = 1 \tag{8d}$$

In addition, the magnitude, $C_0$, of the complex constant, C, is determined by measuring transmittance, $T_R$, of DUT 123. Transmittance, $T_R$, may be determined by taking the ratio of the intensity measured at photoreceiver 174 with DUT 123 in place to the intensity measured at photoreceiver 174 with DUT 123 replaced in interferometer arm 131 by an effectively zero loss patch cord (not shown). Hence, $$C_0 = \sqrt{\frac{T_R}{|k_4|^2 (1 + |k_1|^2)}} \qquad (9)$$

Note that the electric field, $\vec{E}_{out}$, of the light that passes through DUT 123 and through polarizer 160 can be determined by using equation (10) when $\hat{x}$-polarized input light is used:

$$\begin{pmatrix} E_{xout} \\ E_{yout} \end{pmatrix} = \begin{pmatrix} 1 & 0 \\ 0 & 0 \end{pmatrix} C \begin{pmatrix} u_{11} & u_{12} \\ u_{21} & u_{22} \end{pmatrix} \begin{pmatrix} 1 \\ 0 \end{pmatrix} \qquad (10)$$

The electric field, $\vec{E}_{out}$, of the light beam traveling through interferometer arm 131 interferes with the electric field, $E_{tls} e^{i\omega\tau_{tls}}$, of the light beam passing through interferometer arm 132. Here, $\tau_{tls}$ is the time it takes for the light beam to propagate from tunable laser source 110 through interferometer arm 132 to where the interference occurs on photodetector 171, phototdetector 172, photodetector 173 or photodetector 174. The field incident on photodetector 171 due to the two light beams is given by the sum $E_{xout} + E_{tls} e^{i\omega\tau_{tls}}$. The intensity measured by photodetector 171 is given as:

$$I = C_0^2 |u_{11}|^2 + |E_{tls}|^2 + 2C_0 |u_{11}||E_{tls}|\cos(\phi_C + \phi_{11} - \omega\tau_{tls}) \qquad (11)$$

where $u_{11}$ is represented as $|u_{11}| e^{i\phi_{11}}$ and $C$ as $C_0 e^{i\phi_C}$. The phase $\phi_D$, which is the argument of the cosine in equation (11), may be determined using standard phase detection algorithms. Hence:

$$\phi_D = \phi_C + \phi_{11} - \omega\tau_{tls} \qquad (12)$$

This measurement does not actually determine $\phi_C$ since $\tau_{tls}$ is not typically a known quantity. This uncertainty in $\tau_{tls}$ leads to a constant offset in the group delay. However, $\phi_{11}$, can be determined from, for example, polarimeter 170 measurements of the Stokes parameters, $s_0, s_1, s_2, s_3$ which are measured by polarimeter 170. In terms of the measured Stokes parameters:

$$e^{i\phi_{11}} = \frac{s_2 + is_3}{2a_1 a_2} \qquad (13)$$

where $$a_1 = \sqrt{\frac{s_0 + s_2}{2}}, \qquad a_2 = \sqrt{\frac{s_0 - s_3}{2}};$$

and $a_1$, $a_2$ are the amplitudes of the x and y polarized components of the light, respectively.

Using equation (12) gives:

$$\phi_D - \phi_{11} = \phi_C - \omega\tau_{tls} \qquad (14)$$

showing that the measured quantity $\phi_D - \phi_{11}$ has a phase offset that is linear as a function of frequency, $\omega$ and the measured quantity can be used to determine group delays to within a constant offset. Hence, the transfer matrix, $\underline{T}$, can be written as:

$$\underline{T} = e^{i(\phi_D - \phi_{11})} \begin{pmatrix} u_{11} & u_{12} \\ u_{21} & u_{22} \end{pmatrix} \qquad (15)$$

With reference to equation (5), the desired fast and slow group delays may now be determined to within a constant offset:

$$\tau_g^{\pm} = \frac{d(\phi_D - \phi_{11})}{d\omega} + \text{eigenvalue}\left\{ \begin{pmatrix} u_{11} & u_{12} \\ u_{21} & u_{22} \end{pmatrix}^{-1} \begin{pmatrix} u_{11} & u_{12} \\ u_{21} & u_{22} \end{pmatrix}' \right\} \qquad (16)$$

where the prime (') denotes differentiation with respect to $\omega$. Rewriting equation (16) in terms of $\phi_C$ and $\omega\tau_{tls}$ clearly shows the constant offset term, $\tau_{tls}$, for the fast and slow group delay:

$$\tau_g^{\pm} = \frac{d\phi_C}{d\omega} - \tau_{tls} + \text{eigenvalue}\left\{ \begin{pmatrix} u_{11} & u_{12} \\ u_{21} & u_{22} \end{pmatrix}^{-1} \begin{pmatrix} u_{11} & u_{12} \\ u_{21} & u_{22} \end{pmatrix}' \right\} \qquad (17)$$

Hence, in accordance with an embodiment of the invention, a hybrid system involving typical polarimeter 170 to determine the Jones matrix and DUT interferometer 190 to make an interferometric measurement using a single polarization state can resolve the fast and slow group delays of DUT 123 to within a constant offset term, $\tau_{tls}$ using processor 199. In addition, the fast and slow chromatic dispersion (CD) corresponding to the derivative with respect to the wavelength, of the fast and slow group delays above, respectively, can be obtained for DUT 123 along with the optical parameters typically determined by polarimeter 170.

Figure 2:
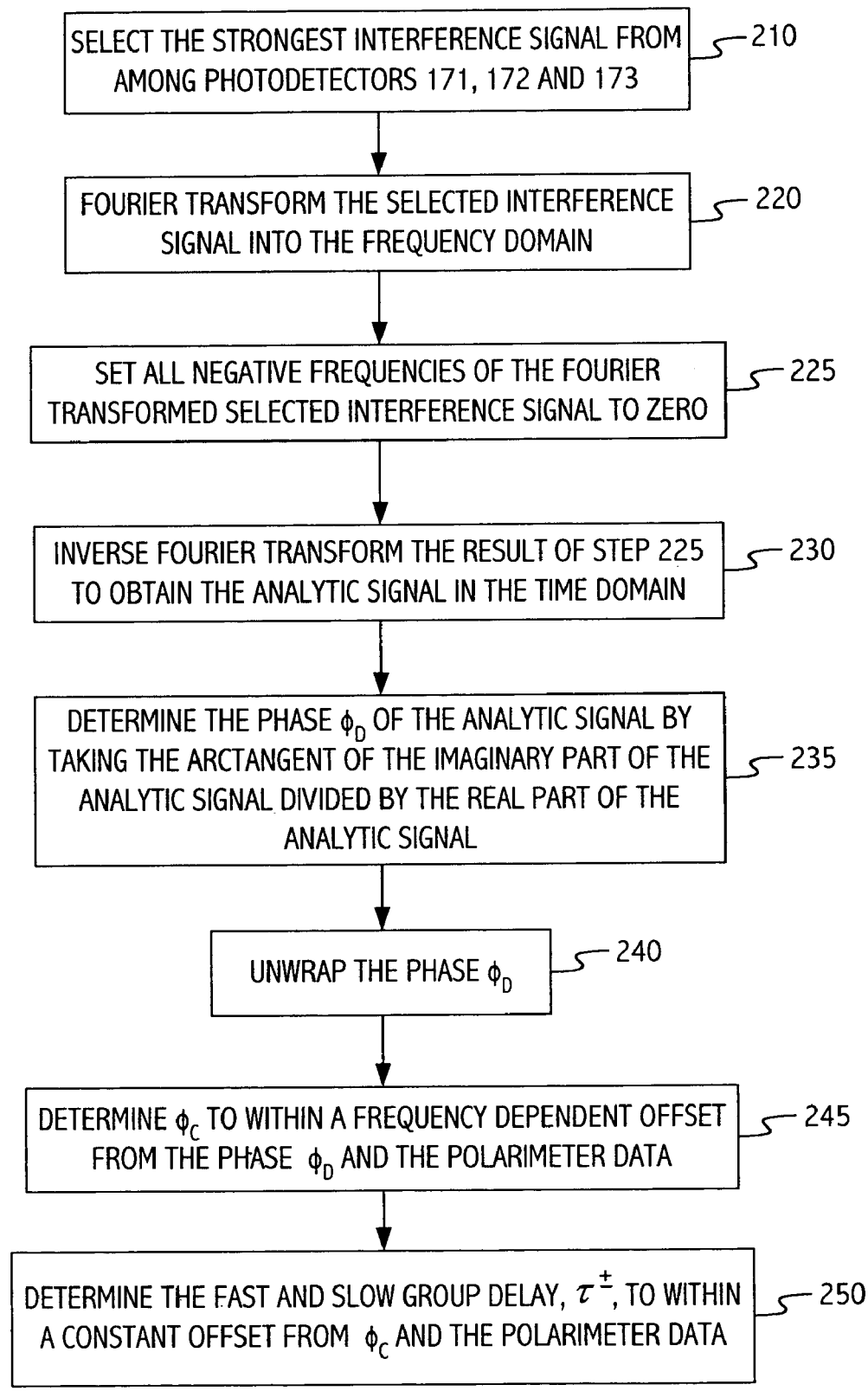
FIG. 2 shows a flow diagram for determining the fast and slow group delay in accordance with the invention.
Figure 4:
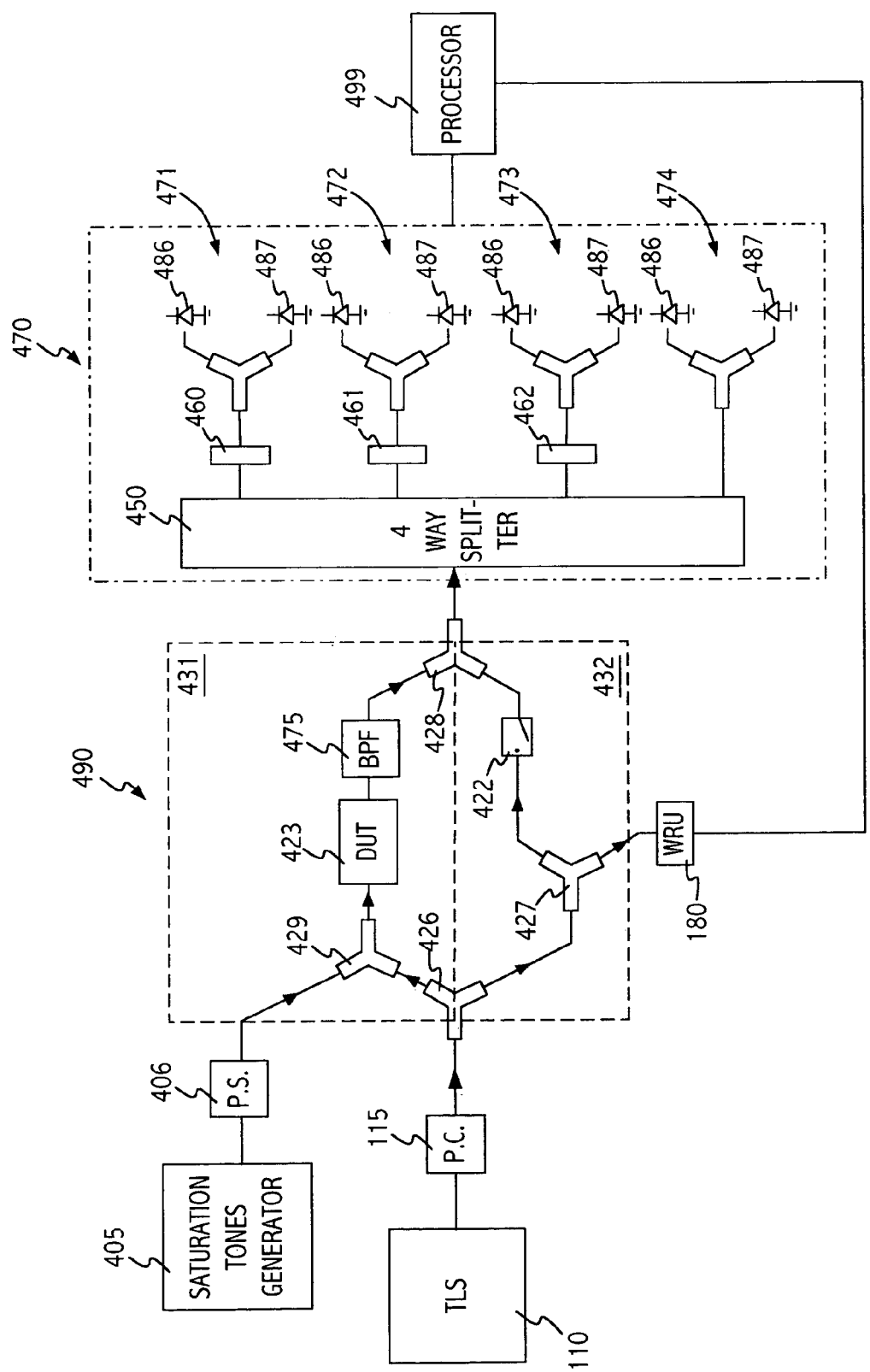
FIG. 4 shows a simplified block diagram of an embodiment in accordance with the invention.
Figure 5:
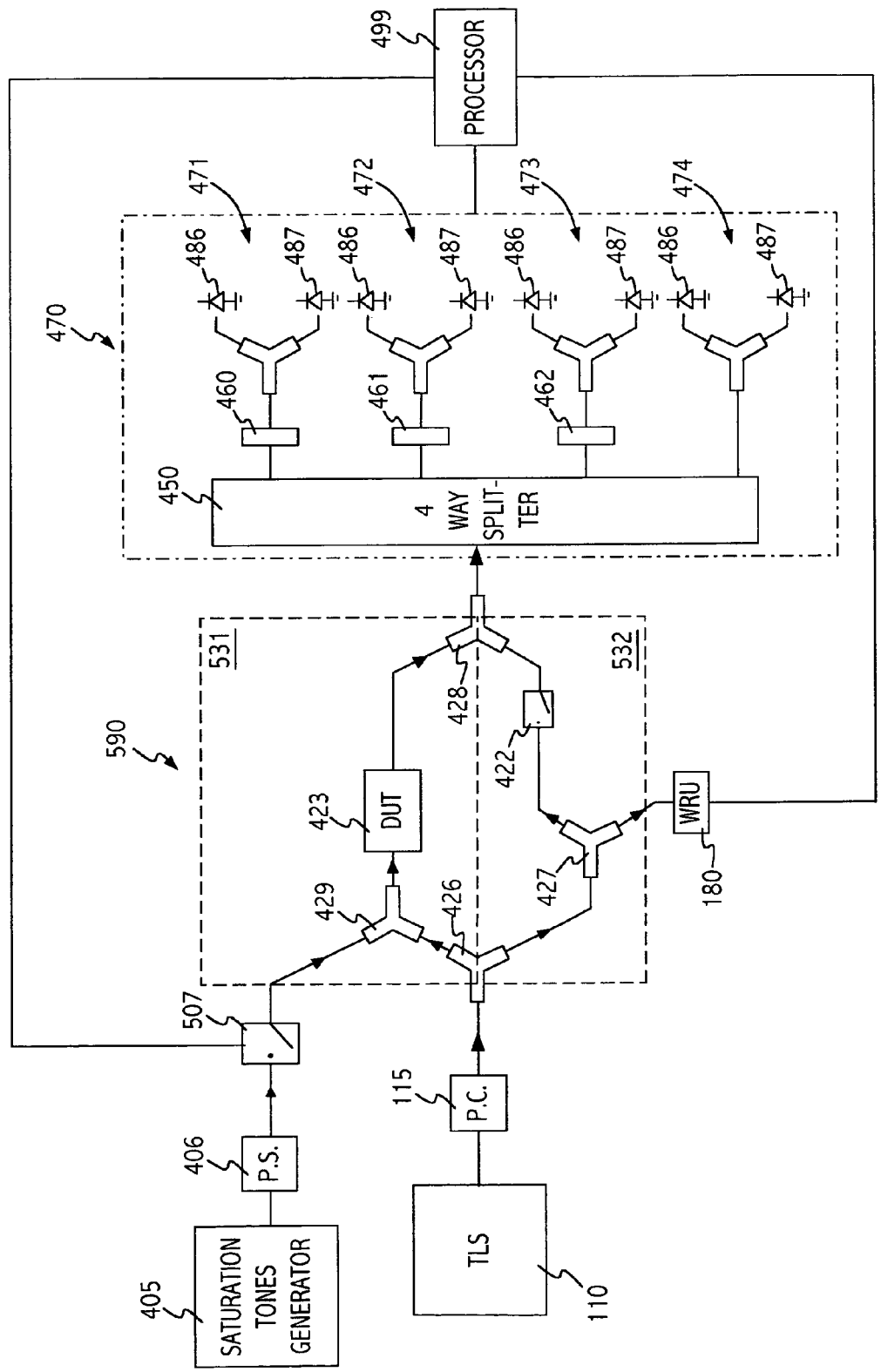
FIG. 5 shows a simplified block diagram of an embodiment in accordance with the invention.

FIG. 2 shows the typical processing that occurs in processor 199 of FIG. 1a, or processor 499 of FIGS. 4 and 5, for determining the fast and slow group delay in accordance with the invention. Via an electrical signal from WRU 180, processor 199 or 499 tracks the frequency of the light beam from TLS 110 as the light beam is frequency swept. In step 210, the interference signals from photodetectors 171, 172 and 173 over a swept frequency range are received as input to processor 199 or 499 and, for example, the strongest interference signal is typically selected for analysis. Methods for determination of the phase, $\phi_D$, are well known, see, for example, "Instantaneous envelope and phase extraction from real signals: theory, implementation, and an application to EEG analysis", by P. Y. Ktonas and N. Papp, Signal Processing, Volume 2, Issue 4, 1980, Pages 373–385.

In the next three steps, the analytic signal of the interference signal selected in step 210 is calculated. In step 220, the selected interference signal (a time series) is numerically Fourier transformed from the time domain into the frequency domain, typically using a Fast Fourier Transform (FFT) procedure. In step 225, all the negative frequencies of the interference signal in the frequency domain are set to zero. In step 230, a numerical inverse FFT is performed on the result of step 225 to obtain the analytic signal of the selected interference signal in the time domain.

In step 235, the phase, $\phi_D$, of the analytic signal determined in step 230 is numerically determined as a function of time by taking the arctangent of the imaginary part of the analytic signal divided by the real part of the analytic signal at each data point. Once the phase, $\phi_D$, of the analytic signal has been determined in step 235, step 240 involves the numerical unwrapping of the phase, $\phi_D$, if needed, using, for example, the MATLAB "unwrap" numerical function or a similar such function or procedure. The "unwrap" procedure is performed because the arctangent function varies only over a specific range, $-\pi$ to $\pi$. The unwrap procedure adds multiples of $2\pi$ whenever the change in consecutive phase terms is more than $\pi$. The phase is time corrected to produce the correct frequency association using the data from WRU 180 which serves to provide precise knowledge of the frequency tuning of TLS 110 as a function of time.

Step 245 involves calculating $\phi_C$ to within a frequency dependent offset, from the phase, $\phi_D$, and the measured polarimeter data from polarimeter 170. Step 245 corresponds to equation (14) if $\hat{x}$-polarized light is used. Depending on which one of photodetectors 171, 172, 173 is selected, the details of the calculation for $\phi_C$ will vary as noted above. Once $\phi_C$ has been calculated to within a frequency dependent offset, step 250 determines $\tau^{\pm}$, the fast and slow group delay to within a constant offset. Step 250 corresponds to numerically evaluating equation (16) above in processor 199 or 499 if $\hat{x}$-polarized light is used. Chromatic dispersion of the principal states of polarization may be determined by taking the derivative with respect to wavelength of the fast and slow group delay terms. From these results, a polarization independent group delay (GD) (to within a constant offset) and chromatic dispersion (CD) can be determined by averaging.

Determination of group delays in embodiments in accordance with the invention as shown in FIGS. 1, 4 and 5 may be impaired by a number of noise sources. In particular, vibrations and acoustic noise can typically cause the length of interferometer arms 131 and 132 to fluctuate. The resulting fluctuation in optical path length leads to variations in the measured data for group delay. Corrections may be provided by monitoring light patterns and providing corrections on the basis of the light patterns monitored. See for example, "Vibration Noise Mitigation in an Interferometric System", U.S. patent application Ser. No. 10/099,480 which is incorporated by reference.

Another typical source of noise in interferometric measurements is phase noise from tunable laser source (TLS) 110. Due to quantum effects, tunable laser source 110 has a finite linewidth. Hence, the light produced at any one time may not be coherent with the light produced at a later time when the time interval is greater than the coherence time of TLS 110 and this leads to phase fluctuations in the output light. Phase fluctuations in the output light lead directly to errors in the measurement of group delay $\tau_g$. See, for example, "Phase Noise Compensation in an Interferometric System", U.S. patent Ser. No. 10/006,490 which is incorporated by reference.

Since both noise sources discussed above, fluctuation of interferometer arm length and phase fluctuations, are random processes, it can be shown that the effect of noise on the measurements can be reduced by averaging. Repeated measurements of group delay $\tau_g$, are typically averaged by processor 199 of FIG. 1a or processor 499 of FIGS. 4 and 5. Hence, noise is reduced by the square root of N where N is the number of measurements performed.

Figure 3:
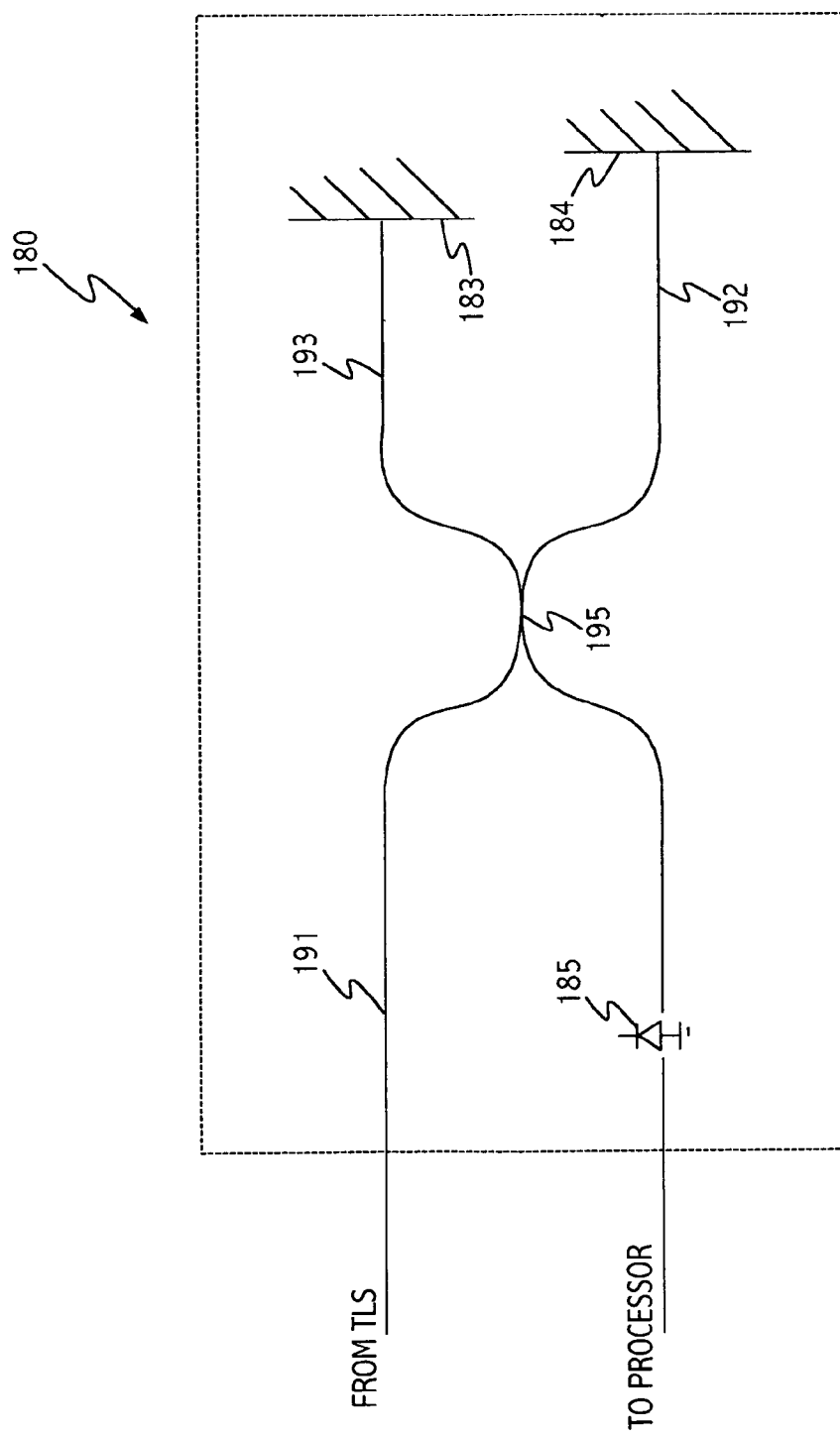
FIG. 3 shows a detailed view of a wavelength reference unit in accordance with an embodiment of the invention.

FIG. 3 shows a detail of typical WRU 180 which is used for tracking the swept frequency of TLS 110 as TLS 110 is swept over a frequency range. WRU 180 typically transmits an electrical signal responsive to the measured frequency to processor 199 or 499. WRU 180 has two Faraday mirrors 183 and 184 with two interferometer arms 192 and 193 with photodetector 185. A light beam enters WRU 180 on optical connection 191 and is split by fiber coupler 195 into two light beams in optical connections 192 and 193, respectively. The two light beams interfere at photodetector 185 after reflection from Faraday mirrors 183 and 184. The optical interference signal is measured by photodetector 185 and is output as an electrical signal to processor 199 in FIG. 1a or to processor 499 in FIGS. 4 and 5.

With reference to FIG. 1a, TLS 110 typically sends light into two interferometers, WRU 180 and DUT interferometer 190 having arms 131 and 132. DUT interferometer 190 measures group delay data for DUT 123. To accurately determine group delay $\tau_g$, to within a constant offset, the frequency tuning of TLS 110 as a function of time is typically required. WRU 180 serves to provide precise knowledge of the frequency tuning as a function of time. In general, the optical path lengths associated with DUT interferometer 190 and WRU 180 are not the same. For example, the arms 131 and 132 of DUT interferometer 190 may be longer than the arms 192 and 193 for WRU 180. In this situation, an error is introduced in determining group delay $\tau_g$ associated with DUT 123 because the group delay determination relies on the frequency tuning rates of TLS 110 as measured by WRU 180.

Optical path length mismatches are particularly detrimental when TLS 110 does not tune its frequency linearly. Current tunable laser technologies typically do not permit completely linear tuning of a laser's frequency sweep. For portions of TLS 110 tuning range, the frequency may change rapidly while for other portions of the tuning range the frequency may change slowly. Nonlinear frequency tuning causes significant errors when DUT interferometer 190 and WRU 180 have differing optical path length. In an embodiment in accordance with the invention, optical path length mismatches may be corrected by applying an experimentally determined time-delay typically either in the hardware or the software of processor 199 (see FIG. 1a) or 499 (see FIGS. 4 and 5) to correct for optical path length mismatches.

As discussed above, optical path length mismatches may typically be corrected by applying a calculated time delay. The appropriate time delay to use is shown by the following analysis.

The radial optical frequency generated by TLS 110 or other typical tunable laser source is typically given by:

$$\omega(t) = 2\pi[\nu_0 + \gamma t + \chi(t)] \quad (18)$$

where $\nu_0$ is the optical frequency at the beginning of the sweep, $\gamma$ is the linear sweep rate, t is time and $\chi(t)$ represents the nonlinear component of the sweep rate. Hence, the intensity, $I_{photodetector\ j}$, incident on photodetector 171, 172, 173 or 174 is proportional to $$I_{photodetector\ j}(t + \tau_m) \propto P_{LO} + P_{DUT} + 2\sqrt{(P_{LO}P_{DUT})}\cos(\phi_{D_j}(t + \tau_m)) \quad (19)$$

where I is the intensity of the signal, $P_{LO}$ is the power received from interferometer arm 132 (FIG. 1a) or 134 (FIG. 1b), $P_{DUT}$ is the power received from interferometer arm 131 (FIG. 1a) or 133 (FIG. 1b), and $\phi_{D_j}$ is the phase of the interference, where all quantities are evaluated at photodetector j, for j=171, 172, 173 or 174. The quantity $\tau_m$ represents the time for light to travel from TLS 110 to any one of photodetectors 171, 172, 173 or 174 in DUT interferometer 190 (FIG. 1a) or 191 (FIG. 1b) via interferometer arm 132 or interferometer arm 134, respectively. The phase of the beat signal in DUT interferometer 190 or 191 is typically given by:

$$\phi_D(t+\tau_m) = 2\pi[\nu_0 + \gamma t - \gamma \tau_1 + \chi(t-\tau_1/2)]\tau_1 \quad (20)$$

$$= \omega(t-\tau_1/2)\tau_1 = \omega_1 \tau_1$$

where it is assumed that the nonlinear component of the sweep, $\chi(t)$, varies slowly on time scales on the order of $\tau_1$. Note that this assumption is valid because $\tau_1$ is typically on the order of $10^{-8}$ s and is the time delay associated with the optical path length difference between interferometer arms 131 and 132 of DUT interferometer 190 (FIG. 1a) or the optical path length difference between interferometer arms 133 and 134 of DUT interferometer 191. The frequency $\omega_1$ is the frequency $\omega$ from equation (18) evaluated at the time $(t-\tau_1/2)$. The phase of the beat signal as measured in WRU 180 is similarly found to be given by:

$$\phi_R(t+\tau_m+\tau_d) = 2\pi[\nu_0 + (y+\chi)(t-\tau_2/2)]\tau_2 \quad (21)$$

$$= \omega(t-\tau_2/2)\tau_2$$

The time delay, $\tau_d$, accounts for the delay incurred by the extra optical path length external to the interferometer. For interferometer 190 in FIG. 1a, for example, the optical path length from optical splitting device 127 to WRU 180 and the optical path length from optical combining device 128 to polarimeter 170 introduce an extra path length external to the interferometer. The time delay, $\tau_2$, is the time delay associated with the difference between optical path lengths 192 and 193 of WRU 180. Experimentally, the phase of WRU 180 is measured at the same time as the phase of DUT interferometer 190 or 191. Hence, equation (21) can be recast as:

$$\phi_R(t+\tau_m) = \omega(t-\tau_2/2-\tau_d)\tau_2 = \omega_2 \tau_2 \quad (22)$$

Note that $\omega_2$ is the radian optical frequency emitted at the time $(t-\tau_2/2-\tau_d)$ by TLS 110. Using DUT interferometer 190 and WRU 180, the group delay of DUT 123 over the range of frequencies swept by TLS 110 can be accurately obtained from the evolution of $\phi_R$ and $\phi_D$. The group delay is given by:

$$\tau_g(\omega_1) = \frac{d\phi_D}{d\omega_1} \quad (23)$$

Because $\phi_D$ is experimentally measured as a function of time and not frequency, equation (23) is not directly evaluated using the measured data. The evolution of $\omega_1$ cannot be extracted from the evolution of the phase $\phi_D$ since $\tau_1$ is a function of frequency. However, the evolution of $\omega_2$ can be obtained from WRU 180 and is given by $\phi_R/\tau_2$ because $\tau_2$ is a constant. It is important to be aware that:

$$\tau_g(\omega_2) \neq \frac{d\phi_D}{d\omega_2} \quad (24)$$

as can be seen by rewriting $\phi_D$ in terms of $\omega_2$ which gives:

$$\phi_D(t+\tau_m) = \left[\omega_2 + 2\pi\left(\frac{\gamma}{2}(2\tau_d+\tau_2-\tau_1)+ \right.\right. \quad (25)$$

$$\left.\left. \chi\left(t-\frac{\tau_2}{2}-\tau_d\right)-\chi\left(t-\frac{\tau_1}{2}\right)\right)\right]\tau_1$$

and differentiating with respect to $\omega_2$ gives:

$$\frac{d\phi_D}{d\omega_2} = \tau_1 + \omega_2 \frac{d\tau_1}{d\omega_2} + 2\pi\left(\tau_d + \frac{\tau_2}{2} - \frac{\tau_1}{2}\right)\left(\frac{d^2\chi(t)}{dt^2}\right)\left(\frac{dt}{d\omega_2}\right)\tau_1 + \quad (26)$$

$$2\pi\left(\tau_d + \frac{\tau_2}{2} - \tau_1\right)\left(\gamma + \frac{d\chi(t)}{dt}\right)\left(\frac{d\tau_1}{d\omega_2}\right)$$

which is clearly not the group delay which is given by:

$$\tau_g = \tau + \omega \frac{d\tau}{d\omega} \quad (27)$$

The last two extra terms in equation (26) are error terms. Under typical conditions, the second error term is negligible in comparison to the first error term. The error terms may be eliminated by applying the transformation $$t \to \frac{1}{2}(\tau_2 - \tau_1) + \tau_d$$

in Eq. (22) which changes $\omega_2 \to \omega_1$, which is the frequency $\omega$ of TLS 110 at the time $(t-\tau_1/2)$ and hence the frequency data from WRU 180 can now be used to provide the correct group delay by processor 199 (see FIG. 1a) or processor 499 (see FIGS. 4 and 5).

In practice, the process of determining the correct time delay may be achieved for an embodiment in accordance with the invention by, for example, introducing a typical two meter single-mode optical fiber patch cord (not shown) in place of the device under test. Hence, a two meter single-mode optical fiber patch cord (not shown) would replace DUT 123 in FIGS. 1a and 1b. or DUT 423 in FIGS. 4 and 5. TLS 110 is then typically tuned over a desired frequency range and the group delay data is monitored for a range of applied time delays to the data. The order of magnitude within which the range lies may be estimated from the optical path length of the two meter single-mode optical fiber divided by the speed of light in a vacuum. The predicted group delay for a two meter single-mode optical fiber patch cord is known to be a constant as a function of frequency if the correct time delay, as derived above, is experimentally selected. Typically, the time delay experimentally input into processor 199 (see FIG. 1) or 499 (see FIGS. 4 and 5) is varied until the group delay becomes a constant for the optical fiber patch cord. Once the time delay is determined for two meter patch cord, the time delay that needs to be applied for arbitrary DUT 123 (see FIGS. 1a and 1b) or DUT 423 (see FIGS. 4 and 5) is typically determined by examining the interference frequency. For example, if DUT 123 is a ten meter optical fiber, the time delay that needs to be applied would be increased by half of the added optical path length divided by the speed of light in a vacuum. Note, that the factor of one half enters from the transformation applied to equation (22). These corrections are typically predetermined and incorporated into processor 199 or 499 so as to be transparent to the user.

It may be of interest to measure the optical parameters: DGD, PMD, PDL, GD and CD of an active device under test (DUT). Typically, an active DUT is an optical fiber amplifier or a semiconductor optical amplifier. Details regarding test and measurement of optical amplifiers may be found in, for example, "Fiber Optics, Test and Measurement", D. Derickson, Prentice-Hall 1998, which is incorporated by reference. An embodiment in accordance with the invention as shown in FIG. 4 allows non-interferometric measurement of the Jones matrix but also allows an interferometric measurement capability to determine the slow and fast group delay to within a constant offset for active DUT 423. Note that the embodiment in accordance with the invention in FIG. 4 has similarities with the embodiment in accordance with the invention in FIG. 1 but has balanced photoreceivers 471, 472, 473 and 474 in polarimeter 470 and introduces saturation tones into active DUT 423 from saturation tones generator 405.

FIG. 4 is a simplified block diagram of an embodiment in accordance with the invention that allows characterization of an active device such as an optical amplifier. With reference to FIG. 4, tunable laser source (TLS) 110 serves as a local oscillator to produce a swept frequency light beam and is optically connected to polarization controller (P.C.) 115. Saturation tone generator 405 is optically connected to polarization scrambler (P.S.) 406. Polarization scrambler 406 optically connects to optical combining device 429. Combining device 429 is typically a fused fiber coupler, and is part of interferometer arm 431 of DUT interferometer 490. Polarization controller 115 connects to optical splitting device 426 which splits the light beam from TLS 110 into interferometer arms 431 and 432. Optical splitting device 426 is typically a fused fiber coupler. Optical splitting device 426 connects to optical combining device 429 and optical splitting device 427 which are part of interferometer arms 431 and 432, respectively, of DUT interferometer 490.

Optical combining device 429 optically connects to active DUT 423 which is optically connected to bandpass filter (BPF) 475. Optical connections to DUT 423 are typically made using pigtails with connectors for easy insertion and removal during component testing. DUT 423 may also be optically connected to optical combining device 429 and BPF 475 using a combination of optical fiber and bulk optics or bulk optics alone as will be apparent to one skilled in the art. Optical splitting device 427 optically connects to optical switch device 422 and optically connects to WRU 180. WRU 180 serves to accurately monitor the frequency of the light from TLS 110 and outputs an electrical signal indicative of the swept frequency light of TLS 110 to processor 499. Optical combining device 428 connects to optical switch 422 in interferometer arm 432. BPF 475 also optically connects to optical combining device 428 which is typically a fused fiber coupler. Optical combining device 428 connects to four-way splitter 450 of polarimeter 470 which splits the light onto four balanced photoreceivers 471, 472, 473 and 474. Balanced photoreceivers 471, 472, 473 and 474 detect an interference signal due to the optical path difference between interferometer arms 431 and 432. Each of balanced photoreceivers 471, 472, 473 and 474 includes photodetectors 486 and 487. Four-way splitter 450 optically connects to linear 0° polarizer 460, linear 45° polarizer 461, right circular polarizer 462 and also directly to balanced photoreceiver 474. Linear 0° polarizer 460, linear 45° polarizer 461 and right circular polarizer 462 are optically connected to balanced photoreceivers 471, 472 and 473, respectively. Polarimeter 470 is electrically connected to processor 499 and is configured in accordance with the invention to use the output from balanced photoreceivers 471, 472, 473 and 474 to determine optical parameters of DUT 123.

The properties of an active device are typically a function of several variables. These variables typically include total power input into active device, the frequency of the light input into the device and the particular combination of frequencies input into the active device. It is therefore important to account for these variables when characterizing active device under test (active DUT) 423 which is typically an optical amplifier such as an erbium-doped fiber amplifier, for example. Saturation tones generator 405 (see FIGS. 4 and 5) allows variation of the total power and the particular frequencies that are input into active DUT 423. The optical stimulation of DUT 423 by saturation tones allows optical parameters of active DUT 423 to be measured under the desired network operating conditions. For example, it may be desirable to characterize the operation of particular type of active DUT 423 in a specific wavelength-division multiplexing (WDM) network. Saturation tones generator 405 can be used to simulate the operating conditions that active DUT 423 would experience in a WDM network and hence characterize the performance of active DUT 423 in such a network. Saturation tone generator 405 typically has an array of lasers at the different frequencies desired for the particular WDM network where active DUT 423 is to be used. Polarization scrambler 406 functions to vary the input polarization of the saturation tones from saturation tones generator 405 and typically serves to prevent undesirable effects such as polarization hole burning in active DUT 423. Polarization hole burning limits the gain achievable from typical optical amplifiers.

The number and respective frequency of the lasers used in saturation tones generator 405 is typically determined from the network environment active DUT 423 is to operate in and saturation tones generator 405 optically stimulates active DUT 423. To perform an interferometric measurement involving active DUT 423 in a selected frequency range in accordance with the embodiment shown in FIG. 4, the laser or lasers in the frequency range to be swept by TLS 110 are typically switched off. TLS 110 is then operated to generate a swept frequency light in the desired frequency range. For non-interferometric measurements of active DUT 423, all the lasers of saturation tones generator 405 are typically left on. Note that BPF 475 in FIG. 4 is typically operated to filter out the saturation tones generated by saturation tone generator 405 and prevent the saturation tones from reaching polarimeter 470. Hence, BPF 475 functions to prevent the saturation tones from corrupting the measurement procedure using the swept frequency from TLS 110. Effective use of BPF 475 in FIG. 4 presumes that the swept frequency light generated by TLS 110 during a measurement has frequencies distinct from any of the saturation tones being generated by saturation tones generator 405 and that these frequencies pass through BPF 475. Because BPF 475 is used to prevent the saturation tones introduced by saturation tones generator 405 from reaching balanced photoreceivers 471, 472, 473 and 474, the operation of the embodiment in accordance with the invention in FIG. 4 and the detailed measurement analysis for active DUT 423 follow the discussion given above for FIG. 1a and DUT 123.

Typically, use of balanced photoreceivers 471, 472, 473 and 474 in FIGS. 4 and 5 in place of single photodetectors 171, 172, 173 and 174 as shown in FIGS. 1a and 1b is important because of the noise sources related to the use of saturation tones generator 405 shown in FIG. 4. For example, bandpass filter 475 typically cannot remove all light related to the saturation tones from saturation tones generator 405. The remaining small amount of saturation tones, is typically sufficient to create noise on both photodetectors 486 and 487 of balanced photoreceivers 471, 472, 473 and 474. Fortunately, the noise is in-phase on both photodetectors 486 and 487 because it is due to intensity fluctuations in the detected optical signals from TLS 110 and not due to the detected optical interference signals. The detected optical interference signals, on the other hand, are 180° out of phase on photodetectors 486 and 487. Hence, a differencing of the signals on photodetectors 486 and 487 allows photoreceivers 471, 72, 473 and 474 to subtract in-phase noise while doubling the detected optical interference signal. For a more detailed explanation of balanced photoreceivers, see, for example, "Coherent Optical Spectrum Analyzer" by Baney et al. in IEEE Photonics Technology Letters, 2002, 14, 3, 355 incorporated by reference.

It is sometimes desirable to perform measurements on active DUT 423 where the effect of saturation tones from saturation tones generator 405 in the frequency range to be swept by TLS 110 is taken into account. An appropriate embodiment in accordance with the invention is shown in FIG. 5. The embodiment shown in FIG. 5 differs from the embodiment shown in FIG. 4. In FIG. 5, interferometer arm 531 of interferometer 590 omits bandpass filter 475 but is otherwise similar to interferometer arm 431. Interferometer arm 532 is similar to interferometer arm 432. However, optical switch 507 is interposed between polarization scrambler 406 and optical combiner 429 to selectively block the saturation tones from saturation tones generator 405 from reaching DUT 423. Measurements on active DUT 423 using TLS 110 are performed at a time when the saturation tones are unable to reach active DUT 423 by the gating action of optical switch 507. Hence, processor 499 only processes data from the time when optical switch 507 is in the open position. Typically, this is accomplished by controlling the gating action of optical switch from processor 499. The embodiment in accordance with the invention shown in FIG. 5 typically requires the measurement of active DUT 423 before the gain recovery of DUT 423 occurs. In this embodiment, the gating frequency at which optical switch 507 is operated by processor 499 is also limited by the sweep rate of TLS 110. In an alternative embodiment in accordance with the invention, optical switch 507 is typically capable of operating at a frequency of several megahertz so that the measurements performed by photoreceivers 471, 472, 473 and 474 are synchronized with optical switch 507 (e.g. see "Fiber Optics, Test and Measurement", D. Derickson, Prentice-Hall 1998, which is incorporated by reference). Hence, optical switch 507 is always in the open position and saturation tones are not reaching active DUT 423 when measurement data is sampled. Other ways of mitigating the effects of the saturation tones during the measurement of the optical parameters of active DUT 423 using embodiments in accordance with the invention will be apparent to those skilled in the art from the discussion herein.

While the invention has been described in conjunction with specific embodiments, it is evident to those skilled in the art that many alternatives, modifications, and variations will be apparent in light of the foregoing description. Accordingly, the invention is intended to embrace all other such alternatives, modifications, and variations that fall within the spirit and scope of the appended claims.

What is claimed is:

1. A combined interferometric and polarimetric system for performing measurements on a device under test comprising:
   a first interferometer arm having a first end and a second end;
   a second interferometer arm having a first end and a second end;
   a tunable laser source for generating a light beam, said tunable laser source being optically coupled to said first end of said first interferometer arm and to said first end of said second interferometer arm; and
   a polarimeter optically coupled to said second end of said second interferometer arm to receive a second portion of said light beam and selectively optically coupled to said second end of said first interferometer arm to selectively receive a first portion of said light beam, said polarimeter being configured to generate an electrical signal responsive to an intensity signal resulting from the detection of said first portion and said second portion of said light beam when said device under test is inserted between said first end and said second end of said second interferometer arm.

2. The system of claim 1 further comprising a polarization controller to allow adjustment of the polarization of said light beam from said tunable laser source.

3. The system of claim 1 further comprising a processor electrically coupled to said polarimeter, said processor configured to receive said electrical signal from said polarimeter and to determine an optical parameter of said device under test based on said electrical signal.

4. The system of claim 3 wherein said optical parameter is the chromatic dispersion of the principle states of polarization.

5. The system of claim 3 further comprising a wavelength reference unit optically coupled to said tunable laser source to enable monitoring of the frequency of said light beam from said tunable laser source.

6. The system of claim 5 wherein said processor is electrically coupled to said wavelength reference unit to enable said processor to numerically correct for optical path length mismatches.

7. The system of claim 1 wherein said first portion of said light beam selectively received by said polarimeter is not selected to be received.

8. The system of claim 7 wherein said polarimeter generates an electrical signal responsive to the polarization of said second portion of said light beam.

9. The system of claim 1 wherein said polarimeter comprises four photodetectors.

10. The system of claim 1 wherein said polarimeter comprises a linear 0° polarizer, a linear 45° polarizer and a right circular polarizer.

11. The system of claim 1 wherein said device under test is an active device under test.

12. A combined interferometric and polarimetric system for performing measurements on an active device under test comprising:
   a first interferometer arm having a first end and a second end;

a second interferometer arm having a first end and a second end;

a tunable laser source for generating a light beam, said tunable laser source being optically coupled to said first end of said first interferometer arm and to said first end of said second interferometer arm;

a saturation tones generator for generating saturation tones, said saturation tones generator being optically coupled to said first end of said second interferometer arm to receive said saturation tones into said active device under test so that said active device is optically stimulated; and a polarimeter optically coupled to said second end of said second interferometer arm to receive a second portion of said light beam and selectively optically coupled to said second end of said first interferometer arm to selectively receive a first portion of said light basin, said polarimeter being configured to generate an electrical signal responsive to an intensity signal resulting from the detection of said first portion and said second portion of said light beam when said active device under test is inserted between said first end and said second end of said second interferometer arm.

13. The system of claim 12 further comprising a processor electrically coupled to said polarimeter said processor configured to receive said electrical signal from said polarimeter and to determine an optical parameter of said active device under test based on said electrical signal.

14. The system of claim 13 further comprising a wavelength reference unit optically coupled to said tunable laser source to monitor the frequency of said light beam from said tunable laser source.

15. The system of claim 14 wherein a processor is electrically coupled to said wavelength reference unit and to said polarimeter to numerically correct for optical path length mismatches.

16. The system of claim 13 wherein said saturation tones generator is selectively optically coupled to said first end of said second interferometer arm such that said saturation tones are selectively transmitted into said active device under test to allow the determination of said optical parameter by said processor at a time when said saturation tones are not entering said active device under test.

17. The system of claim 13 wherein said optical parameter is chromatic dispersion of the principle states of polarization.

18. The system of claim 12 wherein said polarimeter comprises four balanced photoreceivers to reduce in-phase noise.

19. The system of claim 12 further comprising a polarization controller optically coupled to said tunable laser source to allow adjustment of the polarization of said light beam.

20. The system of claim 12 further comprising a polarization scrambler optically coupled to said saturation tones generator and to said active device under test to prevent polarization hole burning in said active device under test.

21. The system of claim 12 wherein said second inteiferometer arm comprises a bandpass filter that is optically coupled to said active device under test to prevent said saturation tones from reaching said optical combining device.

22. The system of claim 12 wherein said first portion of said light beam selectively received by said polarimeter is not selected to be received.

23. The system of claim 22 wherein said polarimeter generates an electrical signal responsive to the polarization of said second portion of said swept frequency light.

24. A method for making combined interferometric and polarimetric measurements on a device under test comprising:

providing a first interferometer arm having a first end and a second end;

providing a second interferometer arm having a first end and a second end;

optically coupling a tunable laser source for generating a light beam to said first end of said first interferometer arm and to said first end of said second interferometer arm; and optically coupling a polarimeter to said second end of said second interferometer arm to receive a second portion of said light beam and selectively optically coupling said second end of said first interferometer aim to selectively receive a first portion of said light beam, said polarimeter being configured to generate an electrical signal responsive to an intensity signal resulting from the detection of said first portion and said second portion of said light beam when said device under test is inserted between said first end and said second end of said second interferometer arm.

25. The method of claim 24 further comprising providing a polarization controller to allow adjustment of the polarization of said light beam from said tunable laser source.

26. The method of claim 24 further comprising providing a processor electrically coupled to said polarimeter, said processor configured to receive said electrical signal from said polarimeter and to determine an optical parameter of said device under test based on said electrical signal.

27. The method of claim 26 wherein said optical parameter is chromatic dispersion of the principle states of polarization.

28. The method of claim 26 further comprising providing a wavelength reference unit optically coupled to said tunable laser source to enable monitoring of the frequency of said light beam from said tunable laser source.

29. The method of claim 28 wherein said processor is electrically coupled to said wavelength reference unit to enable said processor to numerically correct for optical path length mismatches.

30. The method of claim 24 wherein said first portion of said swept frequency light selectively received by said polarimeter is not selected to be received.

31. The method of claim 30 wherein said polarimeter generates an electrical signal responsive to the polarization of said second portion of said swept frequency light.

32. The method of claim 24 wherein said polarimeter comprises a linear 0° polarizer, a linear 45° polarizer and a right circular polarizer.

33. A combined interferometric and polarimetric system for performing measurements on a device under test comprising:

a tunable laser source for generating a light beam;

a first optical path optically coupled to said tunable laser source;

a second optical path optically coupled to said tunable laser source; and a polarimeter optically coupled to said second optical path to receive a second portion of said light beam and selectively optically coupled to said first optical path to selectively receive a first portion of said light beam, said polarimeter being configured to generate an electrical signal responsive to an intensity signal resulting from the detection of said first portion and said second portion of said light beam when said device under test is optically coupled to said second optical path.

34. The system of claim 33 further comprising a polarization controller to allow adjustment of the polarization of said light beam from said tunable laser source.

35. The system of claim 33 further comprising a processor electrically coupled to said polarimeter, said processor configured to receive said electrical signal from said polarimeter and to determine an optical parameter of said device under test based on said electrical signal.

36. The system of claim 35 wherein said optical parameter is the chromatic dispersion of the principle states of polarization.

37. The system of claim 33 further comprising a wavelength reference unit optically coupled to said tunable laser source to enable monitoring of the frequency of said light beam from said tunable laser source.

38. The system of claim 37 wherein said processor is electrically coupled to said wavelength reference wilt to enable said processor to numerically correct for optical path length mismatches.

39. The system of claim 33 wherein said first portion of said light beam selectively received by said polarimeter is not selected to be received.

40. The system of claim 39 wherein said polarimeter generates an electrical signal responsive to the polarization of said second portion of said light beam.

41. The system of claim 33 wherein said polarimeter comprises four photodetectors.

42. The system of claim 33 wherein said polarimeter comprises a linear 0° polarizer, a linear 45° polarizer and a right circular polarizer.

43. A method for making combined interferometric and polarimetric measurements on a device under test comprising:

providing a tunable laser source;

providing a polarimeter;

providing a first optical path comprising said device under test to optically couple said tunable laser source to said polarimeter; and selectively providing a second optical path to optically couple said tunable laser source to said polarimeter such that when said second optical path is provided, said polarimeter is enabled to perform an optical interference measurement.

44. A combined interferometric and polarimetric system for making measurements on a device under test comprising:

a tunable laser source;

a polarimeter;

a first optical path, said first optical path optically coupling said tunable laser source to said polarimeter when said device under test is part of said first optical path; and a second optical path, said second optical path selectively optically coupling said tunable laser source to said polarimeter such that when said tunable laser source is optically coupled to said polarimeter by said second optical path and that when said device under test is part of said first optical path, said polarimeter is enabled to perform an optical interference measurement.

* * * * *

UNITED STATES PATENT AND TRADEMARK OFFICE
CERTIFICATE OF CORRECTION

PATENT NO. : 7,009,691 B2  Page 1 of 1
APPLICATION NO. : 10/157682
DATED : March 7, 2006
INVENTOR(S) : VanWiggeren et al.

It is certified that error appears in the above-identified patent and that said Letters Patent is hereby corrected as shown below:

On the title page, in field (56), under "Other Publications", in column 2, line 12, delete "Lewen" and insert - - Lewen, - -, therefor.
On the title page, in field (56), under "Other Publications", in column 2, line 15, delete "Shirai" and insert - - Shirai, --, therefor.
On the title page, in field (56), under "Other Publications", in column 2, line 15, delete "ELectroabsorption" and insert - - Electroabsorption - -, therefor.
On the title page, in field (56), under "Other Publications", in column 2, line 19, delete "Analaysis" and insert - - Analysis - -, therefor.

Signed and Sealed this

Eighth Day of August, 2006

JON W. DUDAS
*Director of the United States Patent and Trademark Office*